(12) United States Patent
Byun

(10) Patent No.: US 11,465,526 B2
(45) Date of Patent: Oct. 11, 2022

(54) CHARGING CONTROL METHOD OF ELECTRIC VEHICLE, AND CHARGING CONTROL DEVICE AND ELECTRIC VEHICLE USING THE SAME

(71) Applicants: HYUNDAI MOTOR COMPANY, Seoul (KR); KIA MOTORS CORPORATION, Seoul (KR)

(72) Inventor: Young-Chan Byun, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 196 days.

(21) Appl. No.: 16/930,556

(22) Filed: Jul. 16, 2020

(65) Prior Publication Data

US 2021/0300196 A1 Sep. 30, 2021

(30) Foreign Application Priority Data

Mar. 25, 2020 (KR) .................. 10-2020-0036196

(51) Int. Cl.
*B60L 53/62* (2019.01)
*B60L 50/60* (2019.01)
*H02J 7/00* (2006.01)

(52) U.S. Cl.
CPC .............. *B60L 53/62* (2019.02); *B60L 50/66* (2019.02); *H02J 7/007* (2013.01); *H02J 7/00032* (2020.01)

(58) Field of Classification Search
CPC .......... B60L 53/62; B60L 50/66; B60L 53/14; B60L 53/305; B60L 53/66; B60L 53/60; B60L 50/60; B60L 53/11; B60L 2220/46; B60L 2270/14; H02J 7/00032; H02J 7/007; Y02T 10/70; Y02T 10/7072; Y02T 90/12; Y02T 90/14; Y02T 90/16; B60K 7/0007; B60Y 2200/91
See application file for complete search history.

(56) References Cited

U.S. PATENT DOCUMENTS 9,225,564 B2 * 12/2015 Igarashi ................. H04B 3/06
2012/0288016 A1 11/2012 Ichikawa
(Continued)

FOREIGN PATENT DOCUMENTS

KR 10-1181109 B1 9/2012

OTHER PUBLICATIONS

Extended European Search Report dated Dec. 23, 2020 issued in European Patent Application No. 20185959.2.

*Primary Examiner* — Nha T Nguyen
(74) *Attorney, Agent, or Firm* — Morgan, Lewis & Bockius LLP

(57) ABSTRACT

A charging control method of an electric vehicle includes: storing identification information and a charging stop current value of a charger, when charging is stopped due to a timeout of a Power Line Communication (PLC) communication message transmitted from the charger; confirming whether recharging is performed through the same charger as that when the charging is stopped by using the identification information of the charger, upon recharging; and adjusting a charging current of the charger based on the charging stop current value of the charger, when the recharging is performed through the same charger as that when the charging is stopped.

13 Claims, 5 Drawing Sheets

(56) References Cited

U.S. PATENT DOCUMENTS

| | | | |
|---|---|---|---|
| 2013/0179021 A1* | 7/2013 | Nonaka | B60L 58/15 |
| | | | 701/22 |
| 2014/0333262 A1* | 11/2014 | Ochiai | B60L 53/60 |
| | | | 320/109 |
| 2015/0006343 A1 | 1/2015 | Sako et al. | |
| 2017/0113563 A1* | 4/2017 | Lee | B60L 53/11 |
| 2018/0072169 A1* | 3/2018 | Lee | B60L 53/305 |
| 2019/0061548 A1 | 2/2019 | Lee et al. | |
| 2020/0055406 A1* | 2/2020 | Vallender | H01M 10/615 |
| 2020/0122593 A1* | 4/2020 | Noh | B60L 53/30 |
| 2020/0161907 A1* | 5/2020 | Yang | H02M 3/1582 |
| 2021/0237607 A1* | 8/2021 | Chen | H02J 7/00034 |

* cited by examiner

CHARGING CONTROL METHOD OF ELECTRIC VEHICLE, AND CHARGING CONTROL DEVICE AND ELECTRIC VEHICLE USING THE SAME

CROSS-REFERENCE TO RELATED APPLICATION

This application claims the benefit of priority to Korean Patent Application No. 10-2020-0036196, filed on Mar. 25, 2020 in the Korean Intellectual Property Office, the entire contents of which is incorporated herein by reference.

TECHNICAL FIELD

The present disclosure relates to a charging control method of an electric vehicle, and a charging control device and the electric vehicle using the same, and more particularly, to a charging control method of an electric vehicle, and a charging control device and an electric vehicle using the same, which control charging by reducing a Control Pilot (CP) line noise generated in the charging if recharging is performed through a charger after a charging is stopped by a timeout of a Power Line Communication (PLC) communication message due to the CP line noise while the charging is performed with the charger, thereby making it possible to continuously perform the charging without stopping the charging even in a charger which does not satisfy a charging standard for a Power Spectrum Density (PSD).

BACKGROUND

In recent years, with the expansion of the electric vehicle market and the expansion of the development of electric vehicles by global makers and emerging makers, the international standardization related to electric vehicles is evolving and efforts to preempt standards among nations are fierce.

The electric vehicle is a vehicle which is driven by charging electricity from electrical grid in a battery and is closely related to a charging infrastructure.

Such a charging infrastructure is a system for charging electric vehicles and plug-in hybrid vehicles, and may include a smart grid-connected based charging system technology for charging electric vehicles (charging interface, vehicle-mounted charger, external charger, power amount measurement and billing, and the like), an electric vehicle operation information collection and operation behavior monitoring technology for securing operational effectiveness in terms of service, a smart grid-connected technology which considers an efficient operation through the connection with a power system, and the like.

As such a charging infrastructure becomes more and more important due to the spread of electric vehicles, the efforts to the international standardization are underway.

Particularly, the international standard for the charging interface is IEC 62196-X, which depends on a power supply method. That is, IEC 62196-1 is a connector-inlet common standard for electric vehicles, IEC 62196-2 is a connector-inlet standard for alternate current (AC) electric vehicles, and IEC 62196-3 is a connector-inlet standard for direct current (DC) electric vehicles.

A DC charging method has proposed a combo method as an international standard by a combination of Europe and the US. The combo method has many advantages in terms of design and cost because only one quick and slow inlet needs to be installed. Such a combo method defines a 7-pin combo in Europe and a 5-pin combo in the US as the standard.

Meanwhile, the combo method uses a Power Line Communication (hereinafter referred to as "PLC") technology for communication between an electric vehicle and a charger.

In this regard, the international charging standard (DIN 70121, ISO 15118) defines, as the standard, a portion for the Power Spectrum Density (PSD) which is required to be satisfied between the electric vehicle and the charger.

Accordingly, the electric vehicle performs a process of tuning the intensity of a PLC communication signal in order to satisfy the charging standard based on the charging inlet.

However, the charger does not satisfy the standard content related to the intensity of the PLC communication signal as well as not performing the process of tuning the intensity of the PLC communication signal based on a charging connector.

That is, if the charger does not satisfy the standard content related to the intensity of the PLC communication signal, a noise generated while a charging current increases when the electric vehicle is quickly charged may be greater than the intensity of the PLC communication signal.

In this case, when the electric vehicle is diagnosed with a timeout which makes it impossible to confirm the PLC communication message transmitted from the charger, the electric vehicle enters a charging end sequence to stop the charging. At this time, even if the electric vehicle is recharged with the same charger, the charging is repeatedly stopped, thereby causing confusion and discomfort to the user.

Accordingly, there is a need to provide a method capable of preventing the charging from being stopped even if the electric vehicle uses a charger which does not satisfy the standard content related to the intensity of the PLC communication signal.

The contents described in Description of Related Art are to help the understanding of the background of the present disclosure, and may include what is not previously known to those skilled in the art to which the present disclosure pertains.

SUMMARY

An object of the present disclosure is to provide a charging control method of an electric vehicle, and a charging control device and an electric vehicle using the same, which control charging by reducing a Control Pilot (CP) line noise generated in the charging if recharging is performed through a charger after the charging is stopped by a timeout of a Power Line Communication (PLC) communication message due to the CP line noise while the charging is performed with the charger, thereby continuously performing the charging without stopping the charging even in a charger which does not satisfy a charging standard for a Power Spectrum Density (PSD).

A charging control method of an electric vehicle according to an exemplary embodiment of the present disclosure may include: storing identification information and a charging stop current value of a charger, when charging is stopped due to a timeout of a Power Line Communication (PLC) communication message transmitted from the charger; confirming whether recharging is performed through the same charger as that when the charging is stopped by using the identification information of the charger, upon recharging; and adjusting a charging current of the charger based on the charging stop current value of the charger, when the recharging is performed through the same charger as that when the charging is stopped.

The method may further include setting a charging target current value as the charging stop current value or less, prior to the adjusting of the charging current of the charger, and the adjusting of the charging current of the charger may adjust the charging current based on the charging target current value.

The identification information of the charger may be a Media Access Control (MAC) address of the charger.

The timeout of the PLC communication message may be generated when an intensity of a Control Pilot (CP) line noise is a signal intensity of the PLC communication message or more.

The adjusting of the charging current of the charger may control so that the intensity of the CP line noise is smaller than the signal intensity of the PLC communication message by adjusting the charging current to be smaller than the charging target current value.

A charging control device according to another exemplary embodiment of the present disclosure includes: at least one processor; and a memory configured to store computer-readable instructions, and when being executed by the at least one processor, the instructions may allow a charging control device to store identification information and a charging stop current value of a charger, when charging is stopped due to a timeout of a Power Line Communication (PLC) communication message which is transmitted from the charger, to confirm whether recharging is performed through the same charger as that when the charging is stopped by using the identification information of the charger, upon recharging, and to adjust a charging current of the charger based on the charging stop current value of the charger, when the recharging is performed through the same charger as that when the charging is stopped.

When being executed by the at least one processor, the instructions may allow the charging control device to set a charging target current value as the charging stop current value or less, before adjusting the charging current of the charger, and to adjust the charging current based on the charging target current value, when adjusting the charging current of the charger.

When being executed by the at least one processor, the instructions may allow the charging control device to control so that an intensity of the CP line noise is smaller than a signal intensity of the PLC communication message by adjusting the charging current to be smaller than the charging target current value, when adjusting the charging current of the charger.

An electric vehicle according to another exemplary embodiment of the present disclosure may include: a motor configured to drive a wheel; a battery which provides electric power to the motor; and a charging control device configured to adjust a charging current of a charger based on a charging stop current value of the charger if recharging is performed through the same charger as that when the charging is stopped, after the charging is stopped due to a timeout of a Power Line Communication (PLC) communication message by a Control Pilot (CP) line noise while performing the charging of the battery with the charger.

The charging control device may be included in an Electric Vehicle Communication Controller (EVCC) configured to control quick charging or implemented as an independent configuration.

The charging control device may include at least one processor; and a memory configured to store computer-readable instructions, and when being executed by the at least one processor, the instructions may allow a charging control device to store identification information and a charging stop current value of a charger, when charging is stopped due to a timeout of a PLC communication message which is transmitted from the charger, to confirm whether recharging is performed through the same charger as that when the charging is stopped by using the identification information of the charger, upon recharging, and to adjust the charging current of the charger based on the charging stop current value of the charger, when the recharging is performed through the same charger as that when the charging is stopped.

The present disclosure may control charging by reducing the CP line noise generated in the charging if recharging is performed through a charger after the charging is stopped by the timeout of the PLC communication message due to the CP line noise while the charging is performed with the charger, thereby continuously performing the charging without stopping the charging even in a charger which does not satisfy a charging standard for a PSD.

Further, the present disclosure may allow the electric vehicle to actively distinguish the charger in which charging has been stopped before when attempting to recharge with the same charger after failing to charge with the charger which does not satisfy the charging standard for the PSD, and may enable the charging even in the problematic charger by adjusting the current charging current with reference to the current just before the charging is stopped.

Further, the present disclosure may maintain the charging state when attempting to recharge after the charging is stopped with the charger which does not satisfy the charging standard for the PSD without adding a separate hardware device.

Further, the present disclosure may continuously perform the charging in consideration of the charger in the electric vehicle, thereby increasing charging robustness and compatibility.

Further, the present disclosure may be implemented even in the current charging system of the electric vehicle by improving software without additional hardware.

DESCRIPTION OF SPECIFIC EMBODIMENTS

Figure 1:
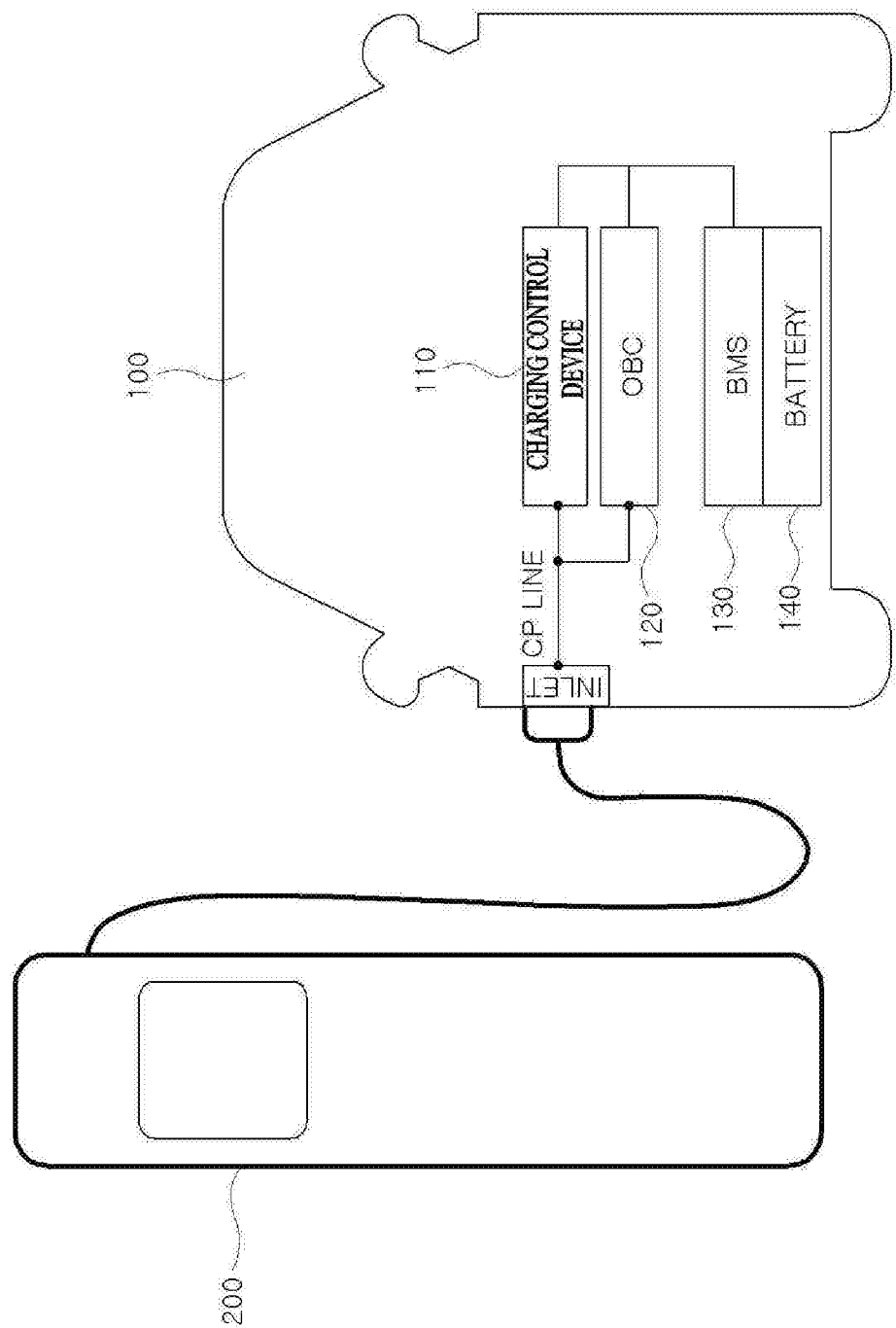
FIG. 1 is a diagram illustrating a charging system of an electric vehicle according to an exemplary embodiment of the present disclosure.

Hereinafter, exemplary embodiments of the present disclosure will be described in detail with reference to the accompanying drawings. However, in the following description and the accompanying drawings, a detailed description of known functions or configurations that may obscure the subject matter of the present disclosure will be omitted.

Further, it should be noted that the same components are denoted by the same reference numerals as much as possible throughout the entire drawings.

The terms or the words used in the present specification and the claims described below should not be construed as limited to general or dictionary meanings, and should be construed based on the meanings and concepts corresponding to the technical spirit of the present disclosure on the basis of the principle that the inventor may appropriately define his/her own disclosure as the terms for the best explanation.

Accordingly, the embodiments described in the present specification and the configurations illustrated in the drawings are merely exemplary embodiments of the present disclosure, and not intended to represent all of the technical spirits of the present disclosure, such that it should be understood that various equivalents and modifications may be substituted for those at the time of filing the present application.

Some elements are exaggerated, omitted, or schematically illustrated in the accompanying drawings, and actual sizes of respective elements are not necessarily represented in the drawings. The present disclosure is not limited by relative sizes or intervals illustrated in the accompanying drawings.

Throughout the entire specification, when a certain portion "includes" a certain component, this means that the other components are not excluded, but may be further included unless specially described otherwise. Further, when a certain portion is "connected" to another portion, it may be "directly connected" or "electrically connected" with other elements interposed therebetween.

The singular forms include the plural forms unless the context clearly indicates otherwise.

It should be understood that the terms "comprises" or "includes," etc. specify the presence of features, integers, steps, operations, components, parts or a combination thereof described in the specification, but do not preclude the presence or addition possibility of one or more other features, integers, steps, operations, components, parts or a combination thereof in advance.

Further, the term "unit" as used in the specification means a software or hardware component, such as FPGA or ASIC, and the "unit" performs any functions. However, the "unit" does not mean to be limited to software or hardware. The "unit" may be configured in the addressable storage medium and also configured to execute one or more processors. Accordingly, the "unit" may include, as an example, components, such as software components, object-oriented software components, class components, and task components, processes, functions, attributes, procedures, subroutines, segments of a program code, drivers, firmware, microcode, circuitry, data, databases, data structures, tables, arrays, and variables. The functionality provided for in the components and "units" may be combined into fewer components and "units" or further separated into additional components and "units."

Hereinafter, exemplary embodiments of the present disclosure will be described in detail with reference to the accompanying drawings so that those skilled in the art to which the present disclosure pertains may easily practice the present disclosure. However, the present disclosure may be implemented in various different forms, and is not limited to the embodiments described herein. Then, in the drawings, portions which are not related to the description of the present disclosure are omitted in order to clearly describe the present disclosure, and similar portions are denoted by similar reference numerals throughout the entire specification.

Hereinafter, exemplary embodiments of the present disclosure will be described with reference to the accompanying drawings.

Figure 2:
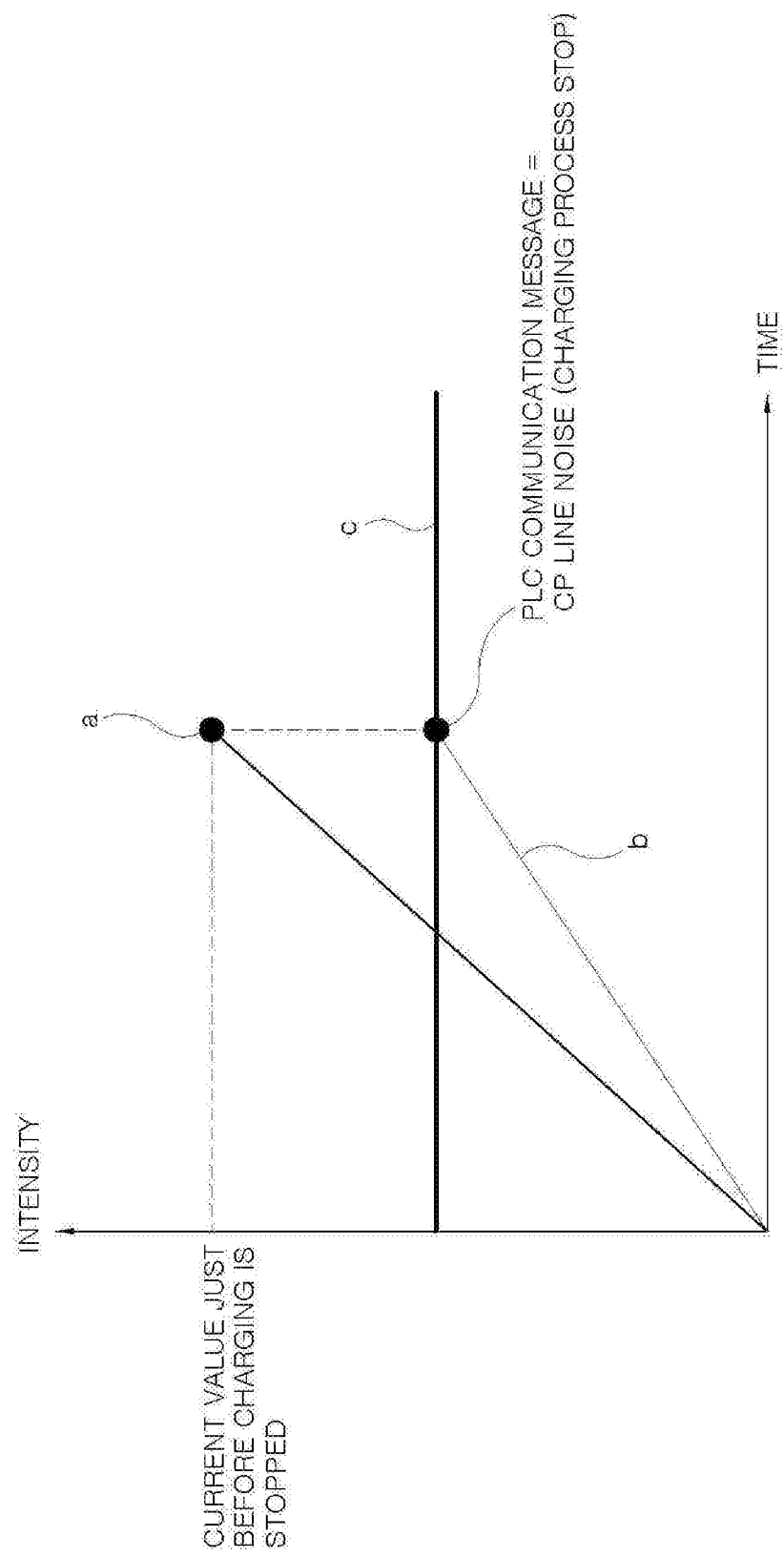
FIG. 2 is a diagram explaining a case of stopping charging according to a timeout of a PLC communication message from a charger.
Figure 3:
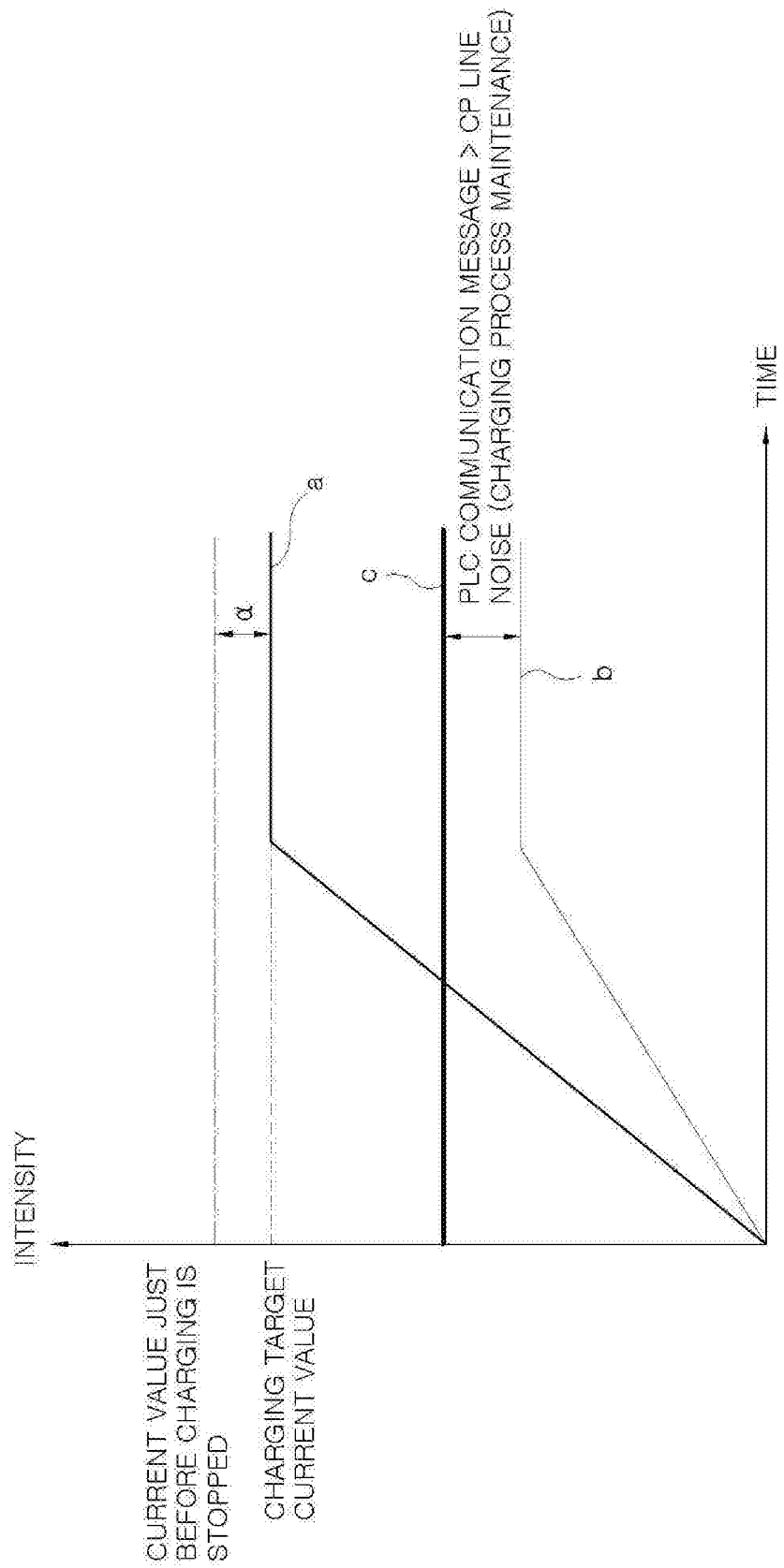
FIG. 3 is a diagram explaining a case of maintaining recharging by adjusting a charging current after the charging is stopped by the charger illustrated in FIG. 2.
Figure 4:
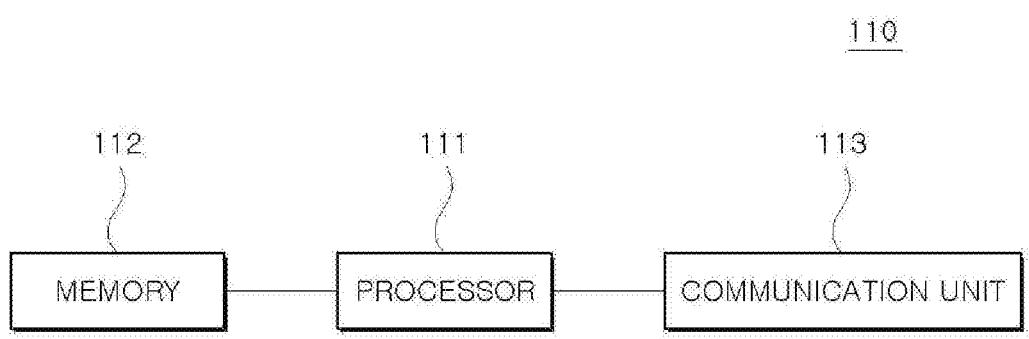
FIG. 4 is a diagram explaining a configuration of a communication control device illustrated in FIG. 1.

FIG. 1 is a diagram illustrating a charging system of an electric vehicle according to an exemplary embodiment of the present disclosure, FIG. 2 is a diagram explaining a case of stopping charging according to a timeout of a PLC communication message from a charger, FIG. 3 is a diagram explaining a case of maintaining recharging by adjusting a charging current after the charging is stopped by the charger illustrated in FIG. 2, and FIG. 4 is a diagram explaining a configuration of a communication control device illustrated in FIG. 1.

As illustrated in FIG. 1, a charging system of an electric vehicle 100 according to an exemplary embodiment of the present disclosure includes a charging control device 110 which controls quick charging, an On Board Charger (OBC) 120 which controls slow charging, a Battery Management System (BMS) 130 which optimally manages a battery 140 to improve safety and reliability, and the battery 140 which charges electricity.

Further, the electric vehicle 100 further includes a motor (not illustrated) for driving a wheel, and the motor receives electric power from the battery 140.

Here, the charging control device 110 may be included in an Electric Vehicle Communication Controller (EVCC), which may be a PLC communication controller for quick charging or may be implemented by an independent configuration.

Further, the charging control device 110, the OBC 120, and the BMS 130 may be connected to each other through Controller Area Network (CAN) communication.

Particularly, the charging control device 110 and the OBC 120 may be connected through a charger (electric vehicle supply equipment, EVSE) 200 and a charging connector. Here, the charging control device 110 may be connected to the charger 200 by a PLC communication method using a frequency band of 1.8 to 30 MHz.

At this time, the charger 200 transmits a pulse width modulation (PWM) signal to the charging control device 110 and the OBC 120 through a control pilot (CP) line. Then, the charging control device 110 and the OBC 120 determine whether the battery is quickly charging or slowly charging through a duty ratio of the PWM signal (that is, a ratio of the H signal and the L signal of the pulse width).

As described above, if the charging current increases when the charging is performed between the electric vehicle 100 and the charger 200, noise may be induced in the CP line from a high voltage DC line. Hereinafter, the noise induced from the high voltage DC line is referred to as 'CP line noise'.

First, if the charger 200 satisfies the charging standard for the Power Spectrum Density (PSD), the charging state for the electric vehicle 100 may be normally maintained. At this time, the charging control device 110 may normally receive the PLC communication message from the charger 200.

However, if the charger 200 does not satisfy the charging standard for the PSD, the charging for the electric vehicle 100 may not be normally maintained. At this time, when the intensity of the CP line noise is the signal intensity of the PLC communication message transmitted by the charger 200 or more, the charging control device 110 may not receive the PLC communication message.

As described above, when not receiving the PLC communication message normally, the charging control device 110 diagnoses it as a timeout state due to the non-receipt of the PLC communication message as defined in the charging standard to enter the charging stop sequence. Here, the timeout state may be a case where the PLC communication message is not received within 0.25 seconds.

At this time, the charging control device 110 stores a Media Access Control (MAC) address and a charging stop current value of the charger 200.

Here, the MAC address may be mutually shared between the charging control device 110 and the charger 200 when the PLC communication is performed upon charging therebetween, and is a unique identification address assigned to the network interface. That is, each of the charging control device 110 and the charger 200 has a unique MAC address.

The MAC address may be unique address information for identifying the charger 200, and may be applied instead as identification information for identifying the charger 200. Here, for convenience of description, the description will be limited to the MAC address.

Further, the charging stop current value may be regarded as a maximum threshold current value at which a charging current may increase when the charging is performed between the electric vehicle 100 and the charger 200. That is, the charging stop current value may be the maximum threshold current value for adjusting the charging current so that the PLC communication message is diagnosed as the timeout state and does not enter the charging stop sequence.

In this regard, referring to FIG. 2, when the charging is performed between the electric vehicle 100 and the charger 200, a charging current (a) increases. At this time, a CP line noise (b) may be induced in the CP line from the high voltage DC line. The CP line noise (b) also increases as the charging current (a) increases. However, the signal intensity of a PLC communication message (c) may be constant.

The intensity of the CP line noise (b) which increases together with the increase in the charging current (a) may be equal to or greater than the signal intensity of the PLC communication message (c). In this case, since the charging control device 110 may not normally receive the PLC communication message (c) due to the interference by the CP line noise (b), the timeout state of the PLC communication message (c) is eventually diagnosed. Accordingly, the charging between the electric vehicle 100 and the charger 200 is stopped. At this time, when the charging is stopped, the current value of the charging current (a) means the charging stop current value (for example, 70 A).

After the charging is stopped, the charging control device 110 may maintain recharging by the charger 200 while controlling CP line noise generated during the charging when the recharging is performed through the charger 200. That is, the charging control device 110 controls the charging of the electric vehicle 100 which continuously maintains the recharging by the charger 200 which does not satisfy the charging standard without stopping.

Specifically, the charging control device 110 confirms whether the recharging is performed through the charger 200 when the recharging is performed after the charging is stopped. This is because the recharging may also be performed through a third charger rather than the charger 200 when the recharging is performed after the charging is stopped.

That is, when the recharging is performed after the charging is stopped, the charging control device 110 confirms whether the recharging is performed through the charger 200 by using the MAC address of the charger 200.

At this time, the charging control device 110 confirms whether the recharging is performed by using the charger 200 by comparing the MAC address of the charger 200 with the MAC address of the charger which is currently recharging.

Next, the charging control device 110 controls the charging of the electric vehicle 100 after setting a charging target current value by using the charging stop current value of the charger 200, when the recharging is performed by using the charger 200.

At this time, the charging control device 110 maintains the recharging by the charger 200 while adjusting the charging current of the charger 200 based on the charging target current value.

That is, the charging control device 110 controls so that the intensity of the CP line noise is smaller than the signal intensity of the PLC communication message by adjusting the charging current by the charger 200 to be smaller than the charging target current value. Here, the charging target current value may be set as the charging stop current value or less. That is, the charging target current value≤the charging stop current value.

In this regard, referring to FIG. 3, the charging control device 110 adjusts so that the charging current (a) is smaller than the charging target current value when being recharged by using the charger 200.

Additionally, the charging target current value may be set to have a predetermined margin ($\alpha$) with the charging stop current value. For example, if the charging stop current value is 70 A, the charging target current value may be 69 A. In this case, the margin ($\alpha$) may be 1 A.

Further, the charging current (a) may be adjusted to be smaller than the charging target current value, and the intensity of the CP line noise (b) may be controlled to be smaller than the signal intensity of the PLC communication message (c).

Accordingly, the charging between the electric vehicle 100 and the charger 200 may be normally performed without stopping the charging even if the charger 200 does not satisfy the charging standard.

Further, the charging control device 110 performs a charging control method of the electric vehicle 100 according to the embodiment of the present disclosure illustrated in FIG. 5 to be described later.

Referring to FIG. 4, the charging control device 110 includes at least one processor 111, a memory 112 for storing computer-readable instructions, and a communication unit 113 for PLC communication with the charger 200.

When the computer-readable instructions stored in the memory 112 are executed by the at least one processor 111, the charging control device 110 performs the charging control method of the electric vehicle according to an exemplary embodiment of the present disclosure illustrated in FIG. 5 to be described later.

Here, the processor 111 may also be referred to as a controller, a microcontroller, a microprocessor, microcomputer, or the like. Further, the processor 111 may be implemented by hardware or firmware, software, or a combination thereof.

Further, the memory 112 may be a single storage device or a collective term of a plurality of storage elements. The computer-readable instructions stored in the memory may be executable program codes or parameters, data, and the like. Further, the memory 112 may include a random access memory (RAM), or may include a magnetic disk storage device or a non-volatile memory (NVRAM) such as a flash memory.

Further, the communication unit 113 transmits and receives data based on the Ethernet with the charger 200 through PLC communication. That is, the communication unit 113 performs a charging sequence by mutually sharing the MAC address with the charger 200. For example, the MAC address of the charger 200 may be '04:55:65:00:45:67', and the MAC address of the electric vehicle 100 may be '00:B0:52:FF:FF:02'. Here, the MAC address stored when the charging is stopped becomes '04:55:65:00:45:67', which is the MAC address of the charger 200.

Hereinafter, a charging control method of an electric vehicle according to an exemplary embodiment of the present disclosure will be described with reference to FIG. 5 to be described later.

Figure 5:
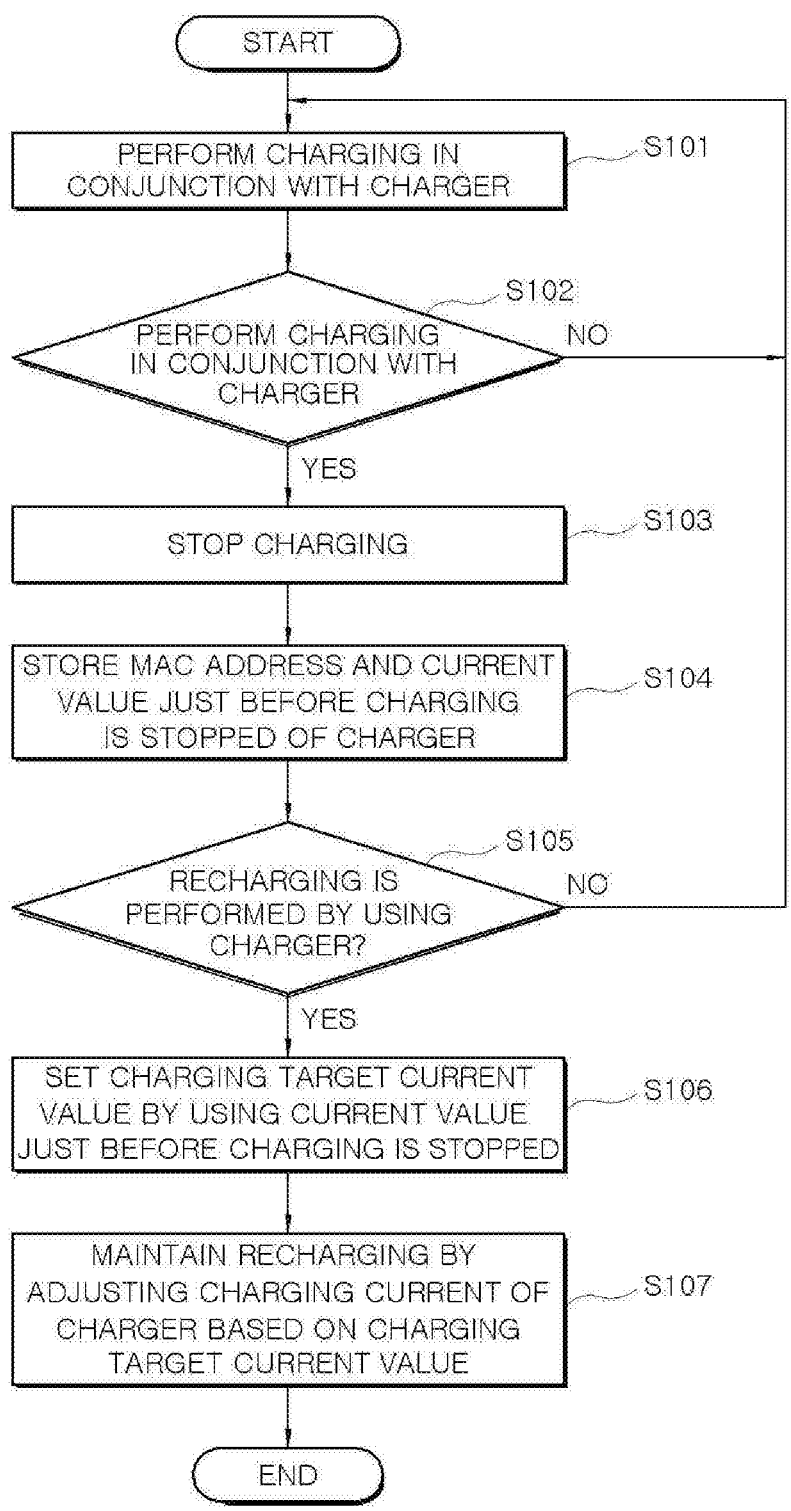
FIG. 5 is a diagram illustrating a charging control method of an electric vehicle according to an exemplary embodiment of the present disclosure.

FIG. 5 is a diagram illustrating a charging control method of an electric vehicle according to an exemplary embodiment of the present disclosure.

The charging control device 110 may be mounted to the electric vehicle 100 to control battery charging, and performs charging in conjunction with the charger 200 installed to an external charging infrastructure (S101).

Thereafter, the charging control device 110 stops charging by diagnosing the timeout of the PLC communication message which is transmitted from the charger 200 (S102, S103). At this time, the charging control device 110 stores the MAC address and the charging stop current value of the charger 200 at which the charging is stopped (S104).

Meanwhile, the charging control device 110 confirms whether the recharging is performed through the charger 200 by using the MAC address of the charger 200 (S105).

Then, the charging control device 110 sets the charging target current value by using the charging stop current value of the charger 200 (S106), if the recharging is performed through the charger 200 (S105), and maintains the recharging by the charger 200 while adjusting the charging current of the charger 200 based on the charging target current value (S107).

That is, the charging control device 110 controls so that the intensity of the CP line noise is smaller than the signal intensity of the PLC communication message by adjusting the charging current to be smaller than the charging target current value, thereby preventing the charging from being stopped due to the timeout diagnosis of the PLC communication message.

The method in accordance with some embodiments may be implemented in the form of program instructions that may be executed through various computer means to be recorded on a computer-readable medium. The computer-readable medium may include program instruction, data file, data structure, and the like, alone or in combination thereof. The program instruction recorded on the medium may be those specially designed and constructed for the present disclosure, or may be known and available to those skilled in the art of computer software. Examples of the computer-readable medium include magnetic media such as a hard disk, a floppy disk, and a magnetic tape, optical media such as CD-ROM and DVD, magneto-optical media such as a floptical disk, and a hardware device specifically configured to store and execute program instructions such as ROM, RAM, and flash memory. Examples of the program instruction include machine language code such as those generated by a compiler, as well as high-level language code that may be executed by a computer using an interpreter or the like.

Although the present disclosure has been described with a focus on novel features of the present disclosure applied to various embodiments, it will be apparent to those skilled in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A charging control method of an electric vehicle, the method comprising:
   storing identification information and a charging stop current value of a charger, when charging is stopped due to a timeout of a Power Line Communication (PLC) communication message transmitted from the charger;
   confirming whether recharging is performed through the same charger as that when the charging is stopped by using the identification information of the charger, upon recharging; and
   adjusting a charging current of the charger based on the charging stop current value of the charger, when the recharging is performed through the same charger as that when the charging is stopped,
   wherein the timeout of the PLC communication message is generated when an intensity of a Control Pilot (CP) line noise is a signal intensity of the PLC communication message or more.

2. The method of claim 1, further comprising setting a charging target current value as the charging stop current value or less, prior to the adjusting a charging current of the charger,
   wherein the adjusting a charging current of the charger adjusts the charging current based on the charging target current value.

3. The method of claim 1, wherein the identification information of the charger is a Media Access Control (MAC) address of the charger.

4. The method of claim 1, wherein the adjusting a charging current of the charger controls so that the intensity of the CP line noise is smaller than the signal intensity of the PLC communication message by adjusting the charging current to be smaller than a charging target current value.

5. A charging control device comprising:
   at least one processor; and
   a memory configured to store computer-readable instructions,
   wherein, when being executed by the at least one processor, the instructions allow a charging control device to:
      store identification information and a charging stop current value of a charger, when charging is stopped due to a timeout of a Power Line Communication (PLC) communication message which is transmitted from the charger,
      confirm whether recharging is performed through the same charger as that when the charging is stopped by using the identification information of the charger, upon recharging, and
      adjust a charging current of the charger based on the charging stop current value of the charger, when the recharging is performed through the same charger as that when the charging is stopped,
   wherein the timeout of the PLC communication message is generated when an intensity of a Control Pilot (CP) line noise is a signal intensity of the PLC communication message or more.

6. The charging control device of claim 5, wherein, when being executed by the at least one processor, the instructions allow the charging control device to:
set a charging target current value as the charging stop current value or less, before adjusting the charging current of the charger, and
adjust the charging current based on the charging target current value, when adjusting the charging current of the charger.

7. The charging control device of claim 5, wherein the identification information of the charger is a Media Access Control (MAC) address of the charger.

8. The charging control device of claim 5, wherein, when being executed by the at least one processor, the instructions allow the charging control device to control so that the intensity of the CP line noise is smaller than the signal intensity of the PLC communication message by adjusting the charging current to be smaller than the charging target current value, when adjusting the charging current of the charger.

9. An electric vehicle comprising:
a motor configured to drive a wheel;
a battery which provides electric power to the motor; and
a charging control device configured to adjust a charging current of a charger based on a charging stop current value of the charger if recharging is performed through the same charger as that when the charging is stopped, after the charging is stopped due to a timeout of a Power Line Communication (PLC) communication message by a control pilot (CP) line noise while performing the charging of the battery with the charger,
wherein the charging control device comprises:
at least one processor; and
a memory configured to store computer-readable instructions,
wherein, when being executed by the at least one processor, the instructions allow a charging control device to:
store identification information and the charging stop current value of the charger, when charging is stopped due to the timeout of the PLC communication message which is transmitted from the charger,
confirm whether recharging is performed through the same charger as that when the charging is stopped by using the identification information of the charger, upon recharging, and
adjust the charging current of the charger based on the charging stop current value of the charger, when the recharging is performed through the same charger as that when the charging is stopped, and
wherein the timeout of the PLC communication message is generated when an intensity of the CP line noise is a signal intensity of the PLC communication message or more.

10. The electric vehicle of claim 9, wherein the charging control device is disposed in an Electric Vehicle Communication Controller (EVCC) configured to control quick charging or implemented as an independent configuration.

11. The electric vehicle of claim 9, wherein, when being executed by the at least one processor, the instructions allow the charging control device to:
set a charging target current value as the charging stop current value or less, before adjusting the charging current of the charger, and
adjust the charging current based on the charging target current value, when adjusting the charging current of the charger.

12. The electric vehicle of claim 9, wherein the identification information of the charger is a Media Access Control (MAC) address of the charger.

13. The electric vehicle of claim 9, wherein, when being executed by the at least one processor, the instructions allow the charging control device to control so that the intensity of the CP line noise is smaller than the signal intensity of the PLC communication message by adjusting the charging current to be smaller than the charging target current value, when adjusting the charging current of the charger.

* * * * *